United States Patent Office 3,004,004
Patented Oct. 10, 1961

3,004,004
HYDROPHILIC POLYPEPTIDES AND THEIR PREPARATION
Charles J. Fox, Rochester, N.Y., assignor to Eastman Kodak Company, Rochester, N.Y., a corporation of New Jersey
No Drawing. Filed Mar. 26, 1958, Ser. No. 723,980
2 Claims. (Cl. 260—78)

This invention relates to hydrophilic polypeptides prepared by treating polypeptides of benzyl glutamic carboxy anhydride while in solution in dichloroacetic acid with hydrogen bromide and the products thus obtained.

Hydrophilic polypeptides are potentially valuable because of their similarity in structure to naturally occurring proteins. For instance, these products can be useful for replacing gelatin such as in photographic products or as peptizers in the preparation of silver halide.

The preparation of synthetic polypeptides of high molecular weight, such as of a degree of polymerization greater than 1,000 by various methods has been suggested such as by the polymerization of amino acids or their suitable derivatives serving as monomers. Attempts to polymerize natural amino acids were recorded even before the existence of the peptide compounds had been clearly established. The main object of these early attempts was synthesis from the structural units of the protein molecule. For instance, a water insoluble polymer having properties resembling those of a horny protein was obtained by adding glycine in glycerol. The product obtained, however, had no definite constitution and apparently represented mixtures of materials.

In many of the well-known methods of peptide synthesis, polypeptides of relatively low molecular weight were obtained. The monomers which have been used for the synthesis of poly amino acids have included the following groups: free amino acids, esters of amino acids, esters and azides of peptides, N-carboxy-γ-amino acid anhydrides. Various conditions have been suggested for carrying out the reaction such as having the monomers in solution in room temperature or in solvents at high temperature to obtain polypeptides of high degrees of polymerization. It has often been desirable to carry out the polymerization of these derivatives in the presence of a basic catalyst. It has been considered desirable to employ amino acid derivatives of a type in which a protective group such as benzyl was present to inhibit secondary reactions. Some of the initiators or catalysts which have been suggested particularly for the preparation of high molecular poly-γ-benzyl-L-glutamates by polymerizing γ-benzyl glutamic-N-carboxy anhydride have been triethyl amine, diethyl amine, sodium methoxide, hexyl amine, sodium hydroxide, or sodium borohydride. The polymerizations have been carried out by dissolving γ-benzyl-N-carboxy-L-glutamic anhydride in a suitable solvent such as dioxane and then carrying out the polymerization under the influence of the initiator or catalyst.

γ-benzyl glutamic-N-carboxy anhydride has been copolymerized with other amino acid N-carboxy anhydrides and the copolymers prepared remain soluble in dioxane when the molar ratio of the first monomer to the second is at least 1:1, such as 1:1, 2:1, 3:1 or in polymerizations in which the γ-benzyl glutamic-N-carboxy anhydride constitutes substantially the entire amount of the monomer present.

After the polypeptide has been prepared, it is desirable to impart a free carboxyl group by removing the blocking benzyl group. Up to now a convenient and practical method of removing this blocking benzyl group has not been available. Methods have been described in which solubility of the polymer in glacial acetic acid was required. However, polypeptdies of high degrees of polymerization obtained from polymerizing γ-benzyl-L-glutamic-carboxyl anhydrides are insoluble in glacial acetic acid and many other organic solvents. It is necessary that the method employed to remove this benzyl group does not simultaneously degrade the polypeptide chain which degradation may seriously detract from the fibrous character of the polymer and increase brittleness even though free carboxyl and amine groups are formed therein.

One object of my invention is to provide a method for supplying free carboxyl groups to polypeptides prepared by the polymerization of γ-benzyl-glutamic-N-carboxy anhydrides. Another object of my invention is to provide a method for supplying free carboxyl groups to polypeptides in which degradation of the polypeptide chain is avoided. A further object of my invention is to provide a method of preparing polypeptides of high molecular weights, the sodium and ammonium salts of which are soluble in water. Other objects of my invention will appear herein.

I have found that polypeptides obtained by the polymerization of amino acid monomers in which at least 50% of the monomer mixture is γ-benzyl-glutamic-N-carboxy anhydride are readily converted to a form wherein free carboxyl groups are present therein if the polymeric material is dissolved in dichloroacetic acid and the resulting solution is treated with anhydrous hydrogen bromide. The resulting product is readily converted to the sodium or ammonium salts thereof by treatment with a sodium or ammonium base and the resulting salts obtained are readily soluble in water. I have found that by this procedure the degree of polymerization of the polypeptide is not appreciably reduced and a product of high molecular weight and good viscosity is obtained. To obtain products having useful properties, it is desirable that the polypeptide have an intrinsic viscosity in dioxane of at least 0.5. Upon treatment of the polypeptide, in accordance with my invention, a product is obtained, the degree of polymerization of which is not appreciably diminished and the sodium or ammonium salt of which is water soluble and useful as addenda to or as a substitute for gelatin in aqueous solutions thereof, particularly for photographic purposes.

In preparing polypeptides from γ-benzyl-glutamic-N-carboxy anhydride, it is desirable that that material constitute at least 50% of the protein derivative employed in the polymerization procedure. The polymerization may be carried out using the γ-benzyl-glutamic-N-carboxy anhydride as the entire amino acid derivative therein or that material may be present in any molar ratio starting with at least equal parts with other amino acid carboxy anhydrides such as those of leucine or glycine. It is preferred that the laevo form of the amino acid derivatives be employed, although a mixture of the laevo and dextro forms of the amino acid derivative can be used.

After the polymer is prepared, it is treated in accordance with my invention which involves dissolving in dichloroacetic acid and applying anhydrous hydrogen bromide thereto over a short period of time to introduce carboxyl groups therein, preferably with temperature control because the replacement of the benzyl group with carboxyl is an exothermic reaction. The hydrogen bromide is conveniently supplied to the reacting material by continuously introducing the gas into the solution over the period of the reaction at a rate which is found to be most convenient by the operator of the procedure. Hydrogen bromide should always be present in the dichloroacetic acid solution over the course of the reaction.

The following examples illustrate both the polymerization of γ-benzyl-glutamic-N-carboxy anhydride and the replacement of benzyl therefrom in accordance with my invention.

*Example 1.—Polymerization of γ-benzyl-L-glutamic-N-carboxy anhydride*

20 grams of γ-benzyl-L-glutamic-N-carboxy anhydride was dissolved in 250 ml. of dioxane and 0.05 grams of triethylamine was added thereto. The mass was allowed to stand overnight. It was then poured into water and a precipitate of fibrous polymer was obtained.

*Example 2*

A solution of 10 grams of poly-γ-benzyl-L-glutamic acid as prepared by the preceding example and having an intrinsic viscosity in dioxane of 0.58 was dissolved in 50 ml. of dichloroacetic acid. This solution was cooled in an open vessel, placed in an ice bath, and anhydrous hydrogen bromide was bubbled therethrough for 20 minutes at the rate of 1 liter of gas every 10 minutes. The product was separated from the mass by precipitation in water and was washed thoroughly with water and with ether to remove hydrogen bromide, dichloroacetic acid, and benzyl bromide. A white fibrous polymer which was soluble in dilute alkali was obtained in 96% yield. The polymer product obtained gave an intrinsic viscosity in dioxane of 0.74 and a carboxyl analysis of 29.2%.

*Example 3*

14 grams of poly-γ-benzyl-L-glutamic acid having an intrinsic viscosity in dioxane of 0.42 was dissolved in 200 ml. of dioxane. There was supplied to the solution, anhydrous hydrogen bromide at the rate of 1 liter of gas every 10 minutes, for 1½ hours at room temperature and for 1 hour at 40–50° C. After this treatment, the polymer remained insoluble in dilute alkali. The solution saturated with hydrogen bromide was allowed to stand overnight at room temperature. The polymer obtained was separated from the mass by precipitation in water and was thoroughly washed as described in the preceding example. A white fibrous polymer was obtained which was soluble in dilute alkali. This product gave an intrinsic viscosity in dioxane of 0.46 and a carboxyl analysis of 22.4%. This example as compared with the preceding exhibits the advantages of using dichloracetic acid as the solvent in the hydrogen bromide treatment as compared to dioxane. When dichloracetic acid is used the reaction rate is improved over that of dioxane.

*Example 4.—Copolymerization of γ-benzyl-L-glutamic-N-carboxy anhydride and L-leucine-N-carboxy anhydride in a 1:1 molar ratio*

5.26 grams of γ-benzyl-L-glutamic-N-carboxy anhydride and 3.14 grams of L-leucine-N-carboxy anhydride was dissolved in 100 ml. of dioxane. 0.01 grams of triethylamine initiator was added and the mass stood for 24 hours at room temperature. An additional 0.01 grams of triethylamine was added and the mass stood for an additional 24 hours. The polymer was separated from the viscous mass by precipitation into water. 5.8 grams of polymer was obtained in 88% yield. This polymer had an intrinsic viscosity in dioxane of 1.81.

*Example 5*

The polymer obtained in the preceding example was dissolved in 50 ml. of dichloroacetic acid which solution was cooled in an ice bath for 30 minutes during which anhydrous hydrogen bromide was supplied thereto at the rate of 1 liter of gas every 10 minutes. The resulting product was separated therefrom by precipitation into water which precipitate was thoroughly washed with water and with ether and was dried. A white fibrous polymer, soluble in dilute alkali and having an intrinsic viscosity in dioxane of 2.22, was obtained quantitatively.

*Example 6.—Copolymerization of γ-benzyl-L-glutamic-N-carboxy anhydride and L-leucine-N-carboxy anhydride in a 2:1 molar ratio*

5.26 grams of γ-benzyl-L-glutamic-N-carboxy anhydride and 1.57 grams of L-leucine-N-carboxy anhydride was dissolved in 100 ml. of dioxane and 0.01 gram of triethylamine was added thereto. After standing for 24 hours at room temperature, an additional 0.01 gram of triethylamine was added and the mass stood for an additional 24 hours. The product thus obtained was separated from the mass by precipitation into water. 4.5 grams of a white fibrous polymer having an intrinsic viscosity of 1.43 in dioxane was obtained in 82% yield.

*Example 7*

The polymer obtained in the preceding example was dissolved in 50 ml. of dichloroacetic acid. The solution was cooled on an ice bath and was treated with anhydrous hydrogen bromide for 30 minutes at the rate of 1 liter of gas every 10 minutes. The product resulting was isolated by precipitation into water and was then washed thoroughly with water and ether and dried. A white fibrous polymer having an intrinsic viscosity of 1.85 in dioxane was obtained in 94% yield.

*Example 8.—Copolymerization of γ-benzyl-L-glutamic-N-carboxy anhydride and L-leucine-N-carboxy anhydride in a 3:1 molar ratio*

7.89 grams of γ-benzyl-L-glutamic-N-carboxy anhydride and 1.57 grams of L-leucine-N-carboxy anhydride was dissolved in 100 ml. of dioxane. There was then added 0.01 gram of triethylamine and after standing 24 hours an additional 0.01 gram of triethylamine was added. The mass then stood for 24 hours longer and the product was then separated by precipitation into water. 6.3 grams of a white fibrous polymer having an intrinsic viscosity of 1.18 in dioxane was obtained in 82% yield.

*Example 9*

The polymer obtained in the preceding example was dissolved in 50 ml. of dichloroacetic acid. The solution was cooled on an ice bath and treated with anhydrous hydrogen bromide for 30 minutes by bubbling the gas through the mass at the rate of 1 liter thereof every 10 minutes. The product obtained was separated from the mass by precipitation into water following which the product was washed thoroughly with water and ether and dried. A white fibrous polymer soluble in dilute alkali and having an intrinsic viscosity of 1.59 in dioxane was obtained quantitatively. This product showed a carboxyl content upon analysis of 27.2%.

Polypeptides may be obtained by copolymerizations in which the benzyl glutamic carboxy anhydride is present in a minor proportion. However, those products are usually insoluble in dioxane and in dilute alkali. The preparation of products of this type are illustrated by the following examples:

*Example 10.—Copolymerization of γ-benzyl-L-glutamic-N-carboxy anhydride and L-leucine-N-carboxy anyhydride in a 1:2 molar ratio*

5.26 grams of γ-benzyl-L-glutamic-N-carboxy anhydride and 6.28 grams of L-leucine-N-carboxy anhydride were dissolved in 100 ml. of dioxane and 0.01 grams of triethylamine was added. The mass stood for 24 hours at room temperature whereupon an additional 0.01 grams of triethylamine was added. The mass was allowed to stand for an additional 96 hours and an almost solid gel was obtained. The gel was diluted to 250 ml. with dioxane and the polymer therein was isolated by precipitation into water. 8.0 grams of white fibrous polymer was obtained representing a 91% yield. This product swelled in, but was not soluble in dioxane.

Example 11

The product obtained in accordance with the preceding example was dissolved in 50 ml. of dichloroacetic acid and the solution was cooled on an ice bath and was treated with anhydrous hydrogen bromide for 2 hours at the rate of 1 liter of gas every 10 minutes. The polymer obtained was precipitated into water, washed thoroughly in water and in ether and was dried. A white fibrous polymer was obtained in 95% yield. This polymer was insoluble in dilute alkali but dissolved when 10% of ethanol was added. The polymer was insoluble in dioxane but swelled therein.

I claim:

1. A process for preparing a hydrophilic polypeptide which comprises dissolving a high molecular weight poly-γ-benzyl-L-glutamic acid, having an intrinsic viscosity in dioxan of at least 0.42, in dichloracetic acid and treating the solution thus obtained with anhydrous hydrogen bromide under cool conditions until the debenzylated polypeptide is soluble in dilute alkali.

2. A process for preparing a hydrophilic polypeptide which comprises dissolving a high molecular weight copolymer formed by polymerizing together γ-benzyl-L-glutamic acid N-carboxy anhydride and L-leucine-N-carboxy anhydride, which copolymer has an intrinsic viscosity in dioxan of at least 0.42, in dichloracetic acid and treating at a lowered temperature with anhydrous hydrogen bromide until the debenzylated polypeptide is soluble in dilute alkali.

References Cited in the file of this patent

UNITED STATES PATENTS 2,630,423    MacDonald   _____ Mar. 3, 1953

OTHER REFERENCES

Sela et al.: J.A.C.S., vol. 78, pp. 746–751 (1956).
Idelson et al.: J.A.C.S., vol. 80, p. 4631 (1958).
Bamford et al.: "Synthetic Polypeptides" (1956), publ. by Academic Press Inc., N.Y.
Noller: Textbook of Organic Chem., 1951, page 146, publ. by W. B. Saunders Co., Philadelphia, Pa.